United States Patent [19]

Manning et al.

[11] Patent Number: 4,637,949

[45] Date of Patent: Jan. 20, 1987

[54] SCRIM REINFORCED, FLAT CLOTH-LIKE COMPOSITE LAMINATE AND A METHOD OF MAKING

[75] Inventors: James H. Manning; Wayne P. Sorenson, both of Appleton, Wis.

[73] Assignee: James River Corporation, Richmond, Va.

[21] Appl. No.: 720,808

[22] Filed: Apr. 8, 1985

Related U.S. Application Data

[63] Continuation of Ser. No. 627,631, Jul. 3, 1984, abandoned.

[51] Int. Cl.⁴ .............................................. B32B 5/12
[52] U.S. Cl. ................................ 428/110; 156/163; 156/306.6; 156/311; 156/324; 428/247; 428/249; 428/284; 428/285; 428/287; 428/297; 428/298; 428/326
[58] Field of Search ............... 428/110, 111, 247, 248, 428/249, 297, 298, 326, 340, 198, 284, 285, 287; 156/163, 164, 291, 306.6, 311, 324

[56] References Cited

U.S. PATENT DOCUMENTS

| | | |
|---|---|---|
| 2,543,101 | 2/1951 | Francis, Jr. ........................ 428/296 |
| 2,841,202 | 7/1958 | Hirschy ............................. 428/284 |
| 2,902,395 | 9/1959 | Hirschy et al. .................... 156/62.2 |
| 3,025,199 | 3/1962 | Harwood ........................... 428/110 |
| 3,341,394 | 9/1967 | Kinney ............................. 428/296 |
| 3,485,706 | 12/1969 | Evans .............................. 28/104 |
| 3,502,538 | 3/1970 | Petersen ........................... 418/296 |
| 3,546,056 | 12/1970 | Thomas ............................ 428/110 |
| 3,575,749 | 4/1971 | Kroyer ............................ 156/370 |
| 3,597,299 | 8/1971 | Thomas et al. ................... 428/110 |
| 3,629,047 | 12/1971 | Davison .......................... 428/249 |
| 3,629,048 | 12/1971 | Davison .......................... 428/249 |
| 3,652,374 | 3/1972 | Condon ........................... 156/174 |
| 3,692,622 | 9/1972 | Dunning .......................... 420/284 |
| 3,700,536 | 10/1972 | Bentzelzen et al. .............. 428/110 |
| 3,708,383 | 1/1973 | Thomas et al. .................. 428/111 |
| 3,709,764 | 1/1973 | Thomas .......................... 156/62.4 |
| 3,726,750 | 4/1973 | Stillings ......................... 156/62.4 |
| 3,753,844 | 8/1973 | Braun ............................. 428/284 |
| 3,755,028 | 8/1973 | Wood ............................. 156/62.2 |
| 3,756,913 | 9/1973 | Wodka ........................... 162/183 |
| 3,765,997 | 10/1973 | Dunning ......................... 156/62.2 |
| 3,769,115 | 10/1973 | Rasmussen et al. .............. 156/72 |
| 3,770,562 | 11/1973 | Newman .......................... 156/290 |
| 3,775,231 | 11/1973 | Thomas .......................... 428/110 |
| 3,794,537 | 2/1974 | Rahmes ........................... 264/112 |
| 3,809,604 | 5/1974 | Estes .............................. 162/100 |
| 3,837,999 | 9/1974 | Chung ............................. 162/101 |
| 3,885,279 | 5/1975 | Darnell et al. ..................... 28/1 |
| 3,895,089 | 7/1975 | Goyal ............................. 264/89 |
| 3,963,392 | 6/1976 | Goyal ............................. 425/83 |
| 4,001,472 | 1/1977 | Thomas et al. .................. 428/110 |
| 4,036,679 | 7/1977 | Back et al. ........................ 162/9 |
| 4,049,491 | 9/1977 | Brandon et al. ................. 428/284 |
| 4,071,651 | 1/1978 | Hicklin et al. ................... 428/284 |
| 4,081,582 | 3/1978 | Butterworth et al. ............. 428/284 |
| 4,082,886 | 4/1978 | Butterworth et al. ............. 428/284 |
| 4,100,324 | 7/1978 | Anderson et al. ................ 428/297 |
| 4,152,479 | 5/1979 | Larsen ........................... 428/224 |
| 4,154,883 | 5/1979 | Elias ............................. 428/171 |
| 4,193,751 | 3/1980 | Miller ........................... 425/83.1 |
| 4,196,245 | 4/1980 | Kitson et al. .................... 428/198 |
| 4,198,460 | 4/1980 | Kiss .............................. 428/284 |
| 4,239,792 | 12/1980 | Ludwa ........................... 428/198 |
| 4,264,290 | 4/1981 | Dunkerly, II ..................... 264/121 |
| 4,284,680 | 8/1981 | Awano et al. .................... 428/234 |
| 4,285,647 | 8/1981 | Dunkerly, II .................... 425/82.1 |
| 4,292,271 | 9/1981 | Boub et al. ...................... 264/113 |

*Primary Examiner*—James J. Bell
*Attorney, Agent, or Firm*—Finnegan, Henderson, Farabow, Garrett & Dunner

[57] ABSTRACT

A method of making a flat cloth-like composite laminate is produced. The method includes the steps of inserting a scrim coated with a thermoplastic binder between two nonwoven layers each of the nonwoven layers being formed of three-dimensional cellulosic fibers bound with a latex adhesive; heating the scrim and the two nonwoven layers to a temperature sufficient to activate the thermoplastic binder while maintaining equal tension on the scrim and the two nonwoven layers; and pressing the scrim and the two nonwoven layers together to form a flat cloth-like composite laminate having the nonwoven layers of cellulosic fibers adhered to opposite sides of the scrim. The surface of each nonwoven layer is planar and interrupted by the scrim.

29 Claims, 3 Drawing Figures

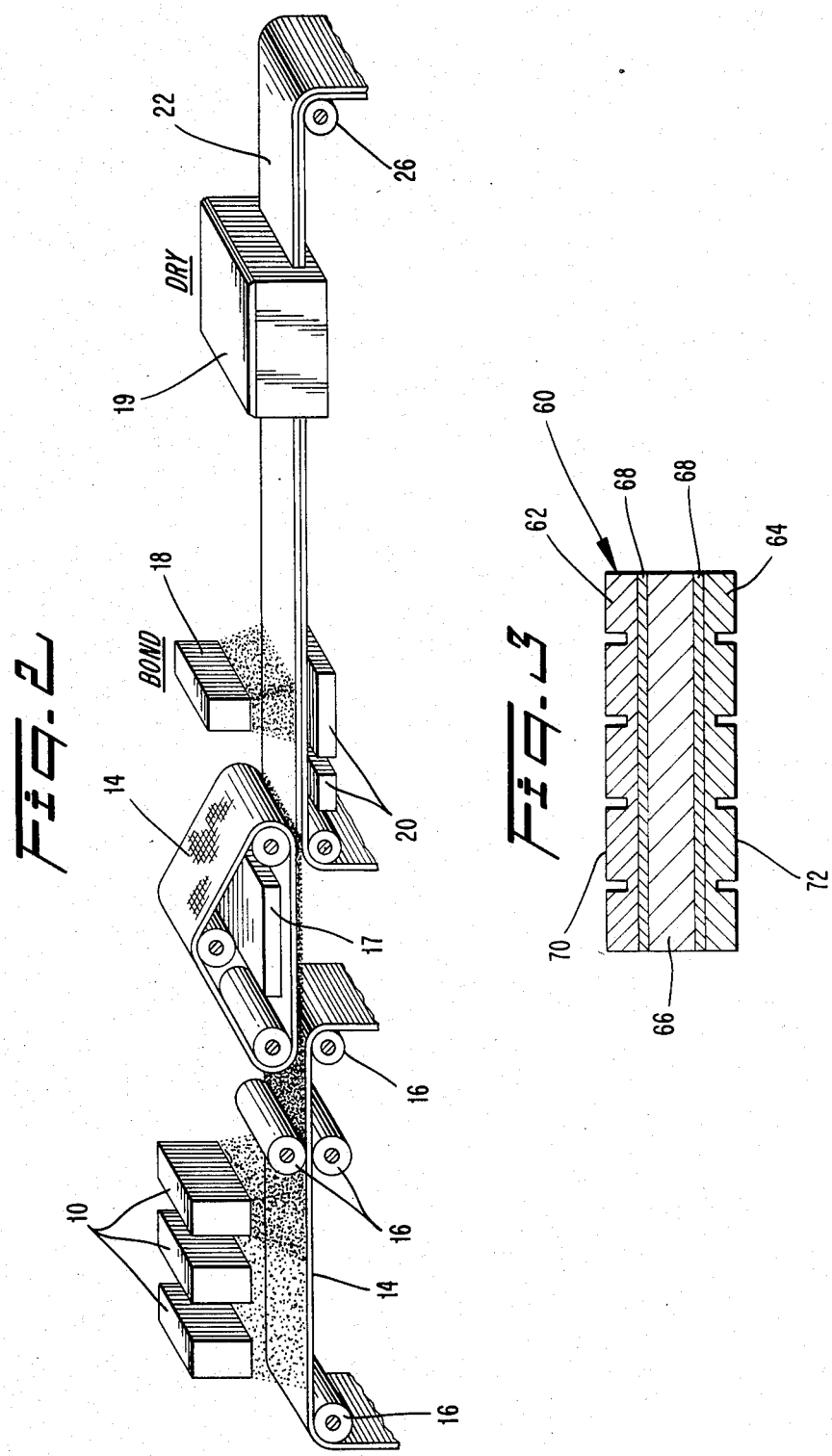

SCRIM REINFORCED, FLAT CLOTH-LIKE COMPOSITE LAMINATE AND A METHOD OF MAKING

This is a continuation of application Ser. No. 06/627,631, filed July 3, 1984, now abandoned.

FIELD OF THE INVENTION

The present invention relates to cloth-like composite laminates and, more particularly, to scrim reinforced, flat cloth-like composite laminates including a layer of cellulosic fibers.

BACKGROUND OF THE INVENTION

It is usually desirable that cellulosic composite laminates exhibit a number of qualities, such as a cloth-like appearance, excellent wet and dry strength, exceptional porosity, very good abrasion resistance and wash durability, an exceptional bulk and water holding capacity, and a lack of a paper rattle. Cellulosic composite laminates that possess these qualities can be used to make towels or tissues that are valuable assets in the performance of a variety of tasks. For example, such a towel or tissue can be used by doctors and nurses as a highly effective and strong hand towel or tissue in both a hospital and an office.

Moreover, it is desirable that the wet and dry strength of the resulting composite laminate be stronger than the sum of the individual layers making up the composite laminate. Such a composite laminate is durable and effective in a number of applications.

Previous processes and cellulosic composite laminates fail to provide one or more of these desirable qualities. For example, in some previous cellulosic composite laminates, the requisite strength, bulk, and cloth-like appearance are not provided in a single tissue or towel. Likewise, previous processes for making cloth-like composites are often complex and expensive to perform.

SUMMARY OF THE INVENTION

The present invention provides a cloth-like composite laminate with a superior balance of properties, such as strength, bulk, cloth-like appearance, abrasion resistance, wash durability, and porosity.

Another feature of the present invention is the provision of a flat and smooth cloth-like composite laminate.

Additional advantages of the invention will be set forth in the description that follows, and in part will be obvious from the description, or may be learned by practice of the invention. The advantages of the invention are realized and obtained by the process and combinations particularly pointed out in the appended claims.

The present invention provides a method of making a flat cloth-like composite laminate comprising the steps of: inserting a scrim coated with a thermoplastic binder between two nonwoven layers, each of the nonwoven layers being formed of three-dimensional cellulosic fibers bound with a latex adhesive; heating the scrim and the two nonwoven layers to a temperature sufficient to activate the thermoplastic binder while maintaining equal tension on the scrim and the two nonwoven layers; and pressing the scrim and the two nonwoven layers together to form a flat cloth-like composite laminate having a nonwoven layer of cellulosic fibers adhered to opposite sides of the scrim. The surface of each nonwoven layer is planar and interrupted by the scrim.

Preferably, the two nonwoven layers, between which the scrim is inserted, are made by forming two separate layers of three-dimensional cellulosic fibers; applying a latex adhesive to each layer of three-dimensional cellulosic fibers; and drying the latex adhesive to form two separate nonwoven layers of cellulosic fibers.

The present invention also provides a flat cloth-like composite laminate comprising: a scrim; two nonwoven layers of three-dimensional cellulosic fibers positioned on opposite sides of the scrim, the surface of each nonwoven layer being planar and interrupted by the scrim; a latex adhesive binding together the cellulosic fibers contained in each nonwoven layer; and a thermoplastic binder binding each nonwoven layer to the scrim.

The present invention overcomes the inherent disadvantages commonly associated with previous scrim reinforced composite laminates and obtains the various advantages of the invention. The cellulosic composite laminates of the present invention also exhibit high wet and dry strength properties, and exceptional porosity. Towels or tissues made from the composite laminates appear cloth-like, and have excellent abrasion resistance and wash durability. The towels or tissues lack the noisy paper rattle that is commonly associated with most cellulosic products.

The foregoing and other features and advantages of the present invention will be made more apparent from the following description of the preferred embodiments.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a schematic diagram illustrating the apparatus used to form the nonwoven layers.

FIG. 3 is a cross section through a cloth-like composite laminate of the present invention.

DESCRIPTION OF THE PREFERRED EMBODIMENT

Figure 1:
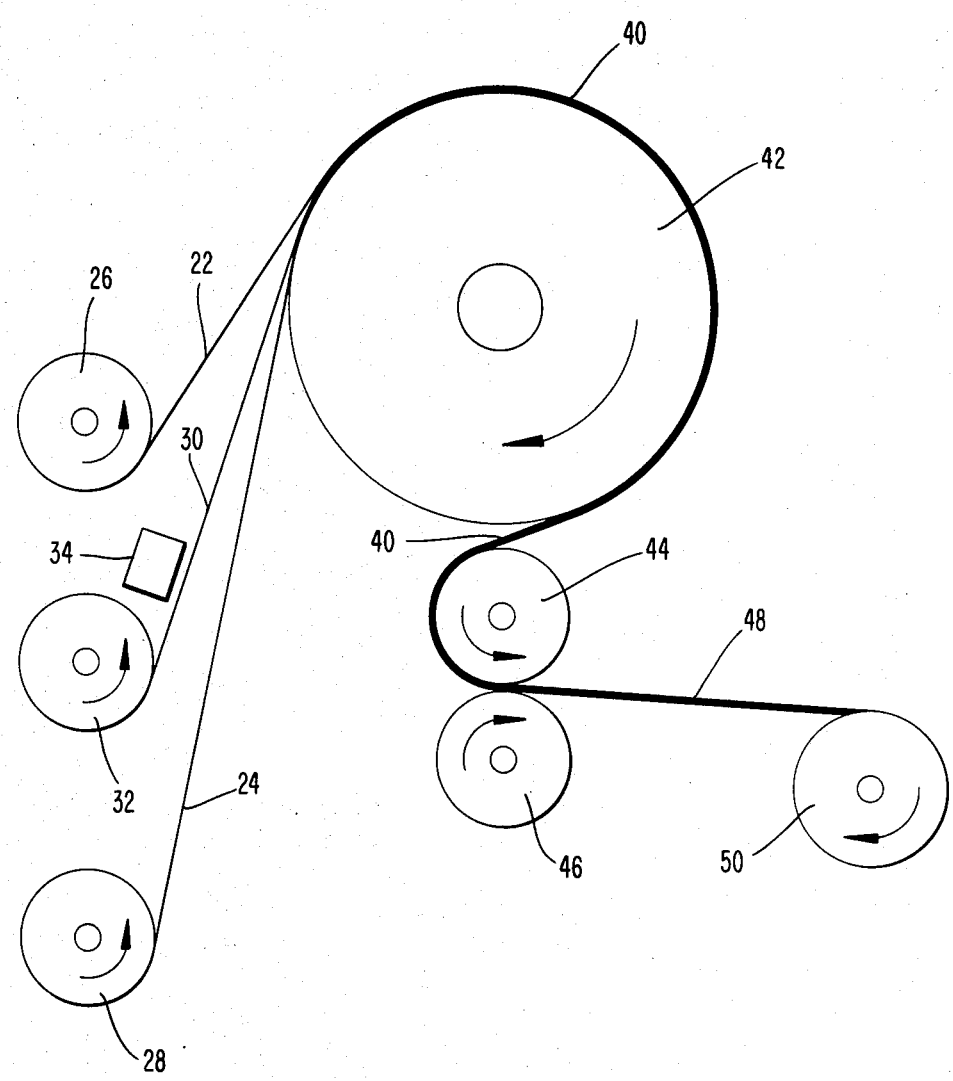
FIG. 1 is a schematic diagram illustrating the apparatus used in the method of the present invention.

Reference will now be made in detail to the present invention, embodiments of which are illustrated in the accompanying drawings.

The method of the present invention produces a flat clothlike composite laminate. The initial step of the method is the insertion of a scrim coated with a thermoplastic binder between two nonwoven layers. Each of the nonwoven layers is formed of three-dimensional cellulosic fibers bound with a latex adhesive. The scrim and the two nonwoven layers are then heated to a temperature sufficient to activate the thermoplastic binder, while maintaining equal tension on the scrim and the two nonwoven layers. Finally, the scrim and the two nonwoven layers are pressed together to form a flat cloth-like composite laminate having a nonwoven layer of cellulosic fibers adhered to opposite sides of the scrim. The surface of each nonwoven layer is planar and interrupted by the scrim.

Prior to the insertion of the scrim between the two nonwoven layers, the nonwoven layers can be formed by first forming two separate layers of three-dimensional cellulosic fibers. A latex adhesive is applied to the three-dimensional cellulosic fibers in each layer. The latex adhesive is subsequently dried by conventional techniques to form two separate nonwoven layers of cellulosic fibers between which the scrim is inserted.

The three-dimensional cellulosic fibers are preferably wood pulp fibers and, most preferably, twisted wood pulp fibers. Preferably, the wood pulp fibers are chemically treated and pre dried to obtain a 90 to 95% solids content. Examples of wood pulp fibers include various mechanical and chemical pulp fibers, such as cedar fibers, southern pine fibers, spruce fibers, and hemlock fibers. Suitable three-dimensional and twisted fibers are prepared by several methods, such as those described in U.S. Pat. Nos. 4,036,679 to Back, 3,809,604 to Estes, and 3,756,913 to Wodka. The particular fibers used depend upon the type of texture, such as soft, wooly, or fluffy, that is desired. Suitable dimensions for the fibers include lengths of from 0.5 millimeters to 5 millimeters, and thicknesses of from 1 micron to 6 microns.

The weight of the cellulosic fibers forming each nonwoven layer is within the range of 20 pounds/ream to 50 pounds/ream. The separate layers containing the cellulosic fibers can be formed by air laying or foam laying the cellulosic fibers onto various belts known in the art. One type of apparatus for air forming each layer of cellulosic fibers is shown in U.S. Pat. No. 4,292,271 to Buob et al. Other techniques known in the art can also be used, such as foam forming as described in U.S. Pat. No. 3,837,999 to Chung or air emulsion as disclosed in U.S. Pat. No. 4,049,491 to Brandon et al.

The latex adhesive, used to bind together the three-dimensional cellulosic fibers in each nonwoven layer, can be selected from various latex adhesives known in the art. Acceptable latex adhesives include acrylate emulsions, butadiene-styrene emulsions, acetate-ethylene emulsions, and acrylonitrile-butadiene emulsions. An especially effective latex adhesive is acetate-ethylene, which is sold under the trademark AIRFLEX A-106 by Air Products, Inc. of Penna.

The skilled artisan can select the particular latex adhesive depending upon the type of cellulosic fibers that are to be bound. The latex adhesive is applied by known techniques such as spraying or foaming.

The amount of solids in the latex adhesive used depends, inter alia, on the weight of the cellulosic fibers in each layer. Generally, latex adhesives having from 15 to 25% solids are used.

The scrim is preferably a continuous filament scrim composed of a polymeric material such as nylon, rayon, polyester, polypropylene, glass, and aramids such as Kevlar and Nomex which are trademarks of the E. I. DuPont de Nemours & Co. An example of a bonded polyester nonwoven material useful as a scrim is Bayex which is a trademark of Bay Mills, Ltd. of Canada. The weight of the scrim is preferably within the range of 0.2 ounce per square yard to 2.0 ounces per square yard. Other scrims, such as a mesh scrim, can also be used in the present invention.

The preferred nonwoven material for the scrim has a set of spaced one-direction threads with a second set of spaced threads lying cross-directionally with respect to the first set of threads. The two sets of threads are bound or adhered together at the points the threads of one set cross the threads of another set. The threads making up the scrim can be in an over and under configuration, as shown in U.S. Pat. No. 3,885,279 to Darnell et al. or a one side pattern, as shown in U.S. Pat. No. 2,902,395 to Hirschy et al. Other scrim configurations known in the art, such as extended netting described in U.S. Pat. No. 4,152,479 to Larsen, can also be used.

The scrim can have various dimensions such as 4 MD/inch, 70 denier by 3 CD/inch, 150 denier; 6 MD/inch, 70 denier by 3 CD/inch, 150 denier; 8 MD/inch, 70 denier by 4 CD/inch, 150 denier; or 12 MD/inch, 70 denier by 4 CD/inch, 150 denier.

The scrim is coated with a thermoplastic binder so that the two nonwoven layers of cellulosic fibers adhere to the sides of the scrim, when the scrim and nonwoven scrim layers are heated after the scrim is inserted between the two nonwoven layers. Examples of acceptable thermoplastic polymer binders include polyvinyl chloride plastisol, polyvinylidene chloride, polyvinyl acetate, ethylene acrylic acid, ethylene vinyl acetate, and ethylene methyl acrylate. Other known thermoplastic binders can also be used. An especially effective polyvinyl chloride plastisol is sold under the trademark BAYEX F-50 by Bay Mills, Ltd.

The skilled artisan can select the particular thermoplastic polymer binder depending upon the type of cellulosic fibers and the scrim that are to be bound together. The scrim can be coated with the thermoplastic polymer binder by various known techniques.

After the scrim is inserted between the two nonwoven layers of cellulosic fibers, equal tension is maintained on the scrim and the two nonwoven layer to make a flat laminate of the scrim and the two nonwoven layers. The equal tension on the scrim and the two nonwoven layers causes them to be stretched an equal amount. Hence, when heat is applied to the scrim and the nonwoven layers, the scrim and the nonwoven layers adhere together to form a flat laminate. Preferably, the scrim and the two nonwoven layers are stretched a minimal amount so as to prevent the quilting of the nonwoven layers on the scrim.

The heat step can be performed by passing the scrim and the two nonwoven layers over a heated roll as shown in FIG. 1. Other heat techniques, however, known in the art, such as use of a rotary through air dryer, a flat bed through air dryer, or an infrared dryer, will also heat the scrim and the nonwoven layers, so long as the requisite equal tension is maintained on the scrim and the nonwoven layers to form a flat laminate.

The heated scrim and the two nonwoven layers are then pressed together to form the cloth-like composite laminate. Sufficient pressure is exerted on the nonwoven layers and the scrim to ensure the formation of the laminate. Preferably, the pressing step is performed by feeding the scrim and the two nonwoven layers through a pair of calender rolls.

The pressing together of the scrim and the nonwoven layers causes the migration of the thermoplastic binder coating on the scrim into the cellulosic fibers of the nonwoven layers. Likewise, the pressing creates the presence of scrim lines in the surface of each nonwoven layer.

The method of the present invention can be performed by various apparatus known in the art, such as the apparatus of U.S. Pat. No. 4,292,271 to Buob et al. As illustrated in FIG. 2, each of the nonwoven layers can be initially made by having a cellulosic fiber laying station 10 deposit cellulosic fibers onto a moving belt 14 that passes through rollers 16 and over a vacuum box 17. Subsequently, an application station 18 applies a latex adhesive to the cellulosic fibers on the belt 14 over various vacuum boxes 20. The cellulosic fibers containing the latex adhesive are then passed through a drying station 19 to dry the latex and to form a nonwoven layer 22, which is collected on a supply roll 26.

As shown in FIG. 1, a scrim 30, such as a continuous filament scrim, is unwound from a supply roll 32 and it is either already precoated or coated with a thermoplastic polymer binder from a binder application station 34. The coated scrim 30 is then inserted between the two nonwoven layers 22 and 24 from supply rolls 26 and 28, while maintaining equal tension on the nonwoven layers 22 and 24 and the scrim 30 as they are unrolled from the supply rolls 26, 28, and 32.

Alternatively, the apparatus can be arranged so that the nonwoven layers 22 and 24 are not rolled onto the supply rolls 26 and 28 prior to scrim insertion. Rather, the nonwoven layer formation and the scrim insertion are conducted as a continuous process.

The nonwoven layers 22 and 24 and the scrim 30, together forming the composite 40, are passed over a heated roll 42, such as a heated steam can, to activate the thermoplastic binder to bind the two nonwoven layer to opposite sides of the scrim. The heated roll 42 has a temperature sufficient to activate the thermoplastic binder and is preferably within the range of 280° F. to 450° F.

The composite 40, after passing over the heated roll 42, is pressed together by feeding the composite 40 through a pair of calender rolls 44 and 46. The nip pressure of the calender rolls 44 and 46 is within the range of 100 pli to 300 pli. The temperature of the calender rolls is within the range of 280° F. to 450° F.

Preferably, one of the calender rolls, such as calender roll 44, is an electrically heated steel calender roll having a temperature of about 350° F. The other calender roll, such as calender roll 46, is a hard rubber roll having a rubber roll shore hardness of 80 to 100 durometers. The formed composite laminate 48 is then taken up on a supply roll 50, for storage until later use.

As a result, the present method produces a cloth-like composite laminate 60, as shown in FIG. 3. The cloth-like composite laminate 60 has two separate nonwoven layers 62 and 64 of cellulosic fibers. The nonwoven layers 62 and 64 are adhered to opposite sides of the scrim 66. A thermoplastic polymer binder 68 coats each side of the scrim 66 to bind the two nonwoven layers 62 and 64 to the scrim 66. The surfaces 70 and 72 of the nonwoven layers 62 and 64 are planar and interrupted by the scrim 66.

Due to the pressure applied to the nonwoven layers and the scrim in the pressing step, the scrim is visible in the nonwoven layers. Similarly, the pressure exerted in the pressing step results in the migration of the thermoplastic binder away from the scrim and into the cellulosic fibers of the nonwoven layers.

The cloth-like composite laminates of the present invention exhibit high wet and dry strength properties, and exceptional porosity. Towels or tissues manufactured from these composite laminates appear cloth-like, and have excellent abrasion resistance and wash durability. The towels or tissues lack the noisy paper rattle that is commonly associated with most cellulosic paper products.

Following are examples of the present invention, which are intended to be merely exemplary of the present invention.

EXAMPLE 1

Using the apparatus shown in FIG. 1, a bonded polyester scrim, sold under the trademark BAYEX by Bay Mills, Ltd., was laminated between two nonwoven layers of three-dimensional twisted cellulosic fibers of Western Hemlock fibers, sold under the trademark AIRFLEX SC 130. The cellulosic fibers were bound with a latex adhesive of ethylene-vinyl acetate, which is sold under the trademark AIRFLEX A-120 by Air Products, Inc. of Penna.

The heated roll 42 had a temperature of 310° F. and the calender roll 44 was heated to 375° F. The nip pressure of the calender rolls 44 and 46 was 150 pli. The calender roll 46 had a rubber roll shore hardness of 90 durometers.

The resulting composite laminate had the following properties:

TABLE 1

| Property | Composite Laminate | Test |
| --- | --- | --- |
| Basis Weight (02/yds) | 3.50 | ASTM D-1910 |
| Caliper (mils 4-ply) | | |
| Grab Tensile Strength, (lbs) | | |
| MD | 15 | ASTM D-1682 |
| CD | 17.3 | |
| Stroll Abrasion (Cycles) | 183 | ASTM D-1175 |
| Bursting Strength (psi) | 23.5 | ASTM D-1424 |

EXAMPLE 2

Using the apparatus of FIG. 1, as described in Example 1, the following composite laminates were prepared. The wet and dry strengths of the resulting composite laminates were measured and compared with the theoretical wet and dry strengths for each composite laminate. The theoretical strengths were determined by measuring and adding together the wet or dry strength of the individual nonwoven layers and the scrim that together form each composite laminate.

TABLE 2

| | Dry Strength | | | | | |
| --- | --- | --- | --- | --- | --- | --- |
| | Composite No. 1 | | Composite No. 2 | | Composite No. 3 | |
| | MD g/ 3 inch | CD g/ 3 inch | MD g/ 3 inch | CD g/ 3 inch | MD g/ 3 inch | CD g/ 3 inch |
| Scrim | 12247 | 8165 | 8165 | 8165 | 6123 | 6123 |
| Nonwoven Layer | 1215 | 815 | 1215 | 815 | 1215 | 815 |
| Theoretical Dry Strength | 14677 | 9795 | 10595 | 9795 | 8553 | 7753 |
| Actual Dry Strength | 14832 | 9752 | 11309 | 9995 | 8490 | 7806 |

TABLE 3

| | Wet Strength | | | | | |
| --- | --- | --- | --- | --- | --- | --- |
| | Composite No. 1 | | Composite No. 2 | | Composite No. 3 | |
| | MD g/ 3 inch | CD g/ 3 inch | MD g/ 3 inch | CD g/ 3 inch | MD g/ 3 inch | CD g/ 3 inch |
| Scrim | 12247 | 8165 | 8165 | 8165 | 6123 | 6123 |
| Nonwoven Layer | 798 | 570 | 798 | 570 | 798 | 570 |
| Theoretical Strength Wet | 13843 | 9305 | 9761 | 9305 | 7719 | 7263 |
| Actual Strength Wet | 14240 | 9365 | 11129 | 9636 | 8218 | 7794 |

As shown by the results in Tables 2 and 3, the resulting composite laminates usually exhibited wet and dry strength properties that were greater than the sum of the wet and dry strength properties of the individual scrim and nonwoven layers that made up the composite laminate.

Other embodiments of the invention will be apparent to one skilled in the art from a consideration of the specification or the practice of the invention disclosed herein. It is intended that the specification and examples be considered as exemplary only with the true scope and spirit of the invention being indicated by the claims.

What is claimed is:

1. A method of making a flat cloth-like composite laminate comprising the steps of:
   (a) inserting a scrim coated with a thermoplastic binder between two nonwoven layers, each of the nonwoven layers being formed of three-dimensional cellulosic fibers bound with a latex adhesive;
   (b) heating the scrim and the two nonwoven layers to a temperature sufficient to activate the thermoplastic binder while maintaining equal tension on the scrim and the two nonwoven layers; and
   (c) pressing the scrim and the two nonwoven layers together to form a flat cloth-like composite laminate having substantially all of each nonwoven layer of cellulosic fibers adhered to opposite sides of the scrim, the surface of each nonwoven layer being planar and interrupted by the scrim.

2. The method of claim 1, wherein the heating step is performed by passing the scrim and two nonwoven layers over one or more heated rolls.

3. The method of claim 2, wherein the heated roll has a temperature within the range of 280° F. to 450° F.

4. The method of claim 1, wherein the pressing step is performed by feeding the scrim and the two nonwoven layers through a pair of calender rolls.

5. The method of claim 4, wherein the calender rolls have a temperature within the range of 280° F. to 450° F.

6. The method of claim 4, wherein the nip pressure of the calender rolls is within the range of 100 pli to 300 pli.

7. The method of claim 1, wherein the thermoplastic binder migrates from the scrim into the cellulosic fibers of the nonwoven layers.

8. The method of claim 1, wherein the three-dimensional cellulosic fibers are wood pulp fibers.

9. The method of claim 8, wherein the wood pulp fibers are selected from the group consisting of cedar fibers, southern pine fibers, spruce fibers, and hemlock fibers.

10. The method of claim 8, wherein the wood pulp fibers are twisted.

11. The method of claim 1, wherein the weight of the three-dimensional cellulosic fibers forming each nonwoven layer is within the range of 20 pounds/ream to 50 pounds/ream.

12. The method of claim 1, wherein the latex adhesive is selected from the group consisting of acrylate emulsions, butadiene-styrene emulsions, acetate-ethylene emulsions, and acrylonitrile-butadiene emulsions.

13. The method of claim 1, wherein the thermoplastic binder is selected from the group consisting of polyvinyl chloride plastisol, polyvinylidene chloride, polyvinyl acetate, ethylene acrylic acid, ethylene vinyl acetate, and ethylene methyl acrylate.

14. The method of claim 1, wherein the scrim is formed by a continuous filament material.

15. The method of claim 1, wherein the scrim is a material selected from the group consisting of nylon, rayon, polyester, polypropylene, glass, and aramids.

16. The method of claim 1, wherein the two nonwoven layers are made by the steps of:
    (a) forming two separate layers of three-dimensional cellulosic fibers;
    (b) applying a latex adhesive to each layer of three-dimensional cellulosic fibers; and
    (c) drying the latex adhesive to form two separate nonwoven layers of cellulosic fibers.

17. A flat cloth-like composite laminate comprising:
    (a) a scrim;
    (b) two nonwoven layers of three-dimensional cellulosic fibers positioned on opposite sides of the scrim, the surface of each nonwoven layer being planar and interrupted by the scrim;
    (c) a latex adhesive binding together the cellulosic fibers contained in each nonwoven layer; and
    (d) a thermoplastic binder coating opposite sides of the scrim and binding substantially all of each nonwoven layer to the scrim.

18. The flat cloth-like composite laminate of claim 17, wherein the thermoplastic binder migrates from the scrim into the cellulosic fibers of the nonwoven layers.

19. The flat cloth-like composite laminate of claim 17, wherein the three-dimensional cellulosic fibers are wood pulp fibers.

20. The flat cloth-like composite laminate of claim 19, wherein the wood pulp fibers are twisted.

21. The flat cloth-like composite laminate of claim 19, wherein the wood pulp fibers are selected from the group consisting of cedar fibers, southern pine fibers, spruce fibers, and hemlock fibers.

22. The flat cloth-like composite laminate of claim 17, wherein the weight of the three-dimensional cellulosic fibers forming each nonwoven layer is within the range of 20 pounds/ream to 50 pounds/ream.

23. The flat cloth-like composite laminate of claim 17, wherein the latex adhesive is selected from the group consisting of acrylate emulsions, butadiene-styrene emulsions, acetate-ethylene emulsions, and acrylonitrile-butadiene emulsions.

24. The flat cloth-like composite laminate of claim 17, wherein the thermoplastic polymer binder is selected from the group consisting of polyvinyl chloride plastisol, polyvinylidene chloride, polyvinyl acetate, ethylene acrylic acid, ethylene vinyl acetate, and ethylene methyl acrylate.

25. The flat cloth-like composite laminate of claim 17, wherein the scrim is made of a continuous filament material.

26. The flat cloth-like laminate of claim 17, wherein the scrim is made from a material selected from the group consisting of nylon, rayon, polyester, polypropylene, glass and aramids.

27. The flat cloth-like composite laminate of claim 17, wherein the weight of the scrim is within the range of 0.2 ounce per square yard to 2 ounces per square yard.

28. The flat cloth-like composite laminate of claim 17, wherein the length of the cellulosic fiber is within the range of 0.5 millimeter to 5 millimeters.

29. The flat cloth-like composite laminate of claim 17, wherein the thickness of the cellulosic fibers is within the range of 1 micron to 6 microns.

* * * * *